United States Patent
De Dinechin et al.

(10) Patent No.: US 7,765,238 B2
(45) Date of Patent: Jul. 27, 2010

(54) MAPPING AN ACTIVE ENTRY WITHIN A HASHED PAGE TABLE

(75) Inventors: Christophe De Dinechin, Sophia-Antipolis (FR); Todd J. Kjos, Cupertino, CA (US); Jonathan K. Ross, Bellevue, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 434 days.

(21) Appl. No.: 11/799,429

(22) Filed: Apr. 30, 2007

(65) Prior Publication Data

US 2008/0270349 A1 Oct. 30, 2008

(51) Int. Cl.
*G06F 17/30* (2006.01)
*G06F 17/00* (2006.01)

(52) U.S. Cl. ..................... 707/802; 707/800
(58) Field of Classification Search ............... None
See application file for complete search history.

(56) References Cited

U.S. PATENT DOCUMENTS 5,848,429 A * 12/1998 McEntee et al. ............ 715/255

* cited by examiner

*Primary Examiner*—Baoquoc N To (57) ABSTRACT

A method for mapping an active entry within a virtually hashed page table is disclosed. An active entry within a virtually hashed page table is populated. A link table for locating a link at an offset from an active entry is maintained. This link table continues to be maintained as a valid link table until an occupied head bucket threshold is exceeded or a collision has occurred.

20 Claims, 6 Drawing Sheets

MAPPING AN ACTIVE ENTRY WITHIN A HASHED PAGE TABLE

TECHNICAL FIELD

Embodiments of the present technology relate to hash tables. More specifically, embodiments of the present technology relate to the rapid identification of active entries within virtually hashed page tables.

BACKGROUND

Within a computer system, various algorithms may be used to search a database for items that satisfy a specified property. For example, a hash table uses algorithms to search for requested information. A hash table is used in a computer to enable fast lookup of data within a database. Furthermore, a hash table is made up of a finite number of head buckets. Each head bucket is capable of holding a limited amount of information.

Hash tables operate by associating a data's key (such as a person's name) with a corresponding value (such as that person's phone number) within the data structure. This operation works by using a hash function to transform the key into a hash value. A hash function is a reproducible method using an algorithm which turns data into a number. For example, this hash function algorithm substitutes and transposes the key to create what is hoped to be a unique number, termed a 'hash value'. Hash values are used to locate head buckets into which a key's corresponding value was placed.

For example, suppose a data's key is 'John Smith' with a corresponding value of phone number '555-555-5555'. A hash function algorithm transforms the key, John Smith, into the hash value, 642. John Smith's corresponding value, 555-555-5555, is then placed in head bucket 642. In response to a user's request for the information corresponding to John Smith, a computer recognizes the data sought as being located in head bucket 642. Head bucket 642 is accessed and the phone number, 555-555-5555, is retrieved.

In another example, suppose a key is the birth date, 'Aug. 27, 1970', which is hashed to be the hash value '6'. The birth date's corresponding value is 'Julie'. Julie is placed into head bucket 6. The next key to be hashed is the birth date 'Jul. 19, 1970' with a corresponding value of 'Bruce'. An algorithmic function hashes the birth date to be '6' and attempts to place the corresponding value Bruce into the head bucket 6. However, head bucket 6 is already full. Since two or more keys hashed to the same hash value cannot be stored in the same head bucket, a collision is created with the attempted addition of data to an already full head bucket. Collisions are resolved by means of "collision chains", where the head buckets point to a linked list containing the colliding entries.

Using the hash value, it is possible to find the information with a limited number of operations such as the following: computing the hash value, indexing the head bucket, and optionally walking the collision chain. Finding an entry in a large set in a small number of operations is the primary reason for using a hash table. When there are no collisions, finding the data associated to a key can be done with a fixed number of operations, which neither depends on the number of elements in the hash table, nor on the number of head buckets.

In some other instances, a computer system may be required to perform a global walk of all head buckets. For example, to delete all the entries in a hash table, it is necessary to examine all of the head buckets one after the other. Such operations require a larger number of operations, at least proportional to the number of head buckets. The number of operations required for such operations remains high even when there is little or no data stored in the hash table. Therefore, a global walk on a nearly empty hash table is an inefficient operation.

Additionally, for reasons such as performance, it is desirable to have a large number of head buckets within a hash table, as it reduces the chances of collision. Consequently, when there are a large number of head buckets, it takes a greater amount of time to walk all the head buckets in the hash table. There exist several hashing function techniques and hash table construction techniques to deal with inefficiencies during global walking. One simple technique would be to keep a list of head buckets containing data, which can be called "active" head buckets. This technique requires an additional field to be added to the head buckets, to store the link between elements of the linked list.

One particular embodiment of hash tables is to represent page table in the Itanium processor architecture. A page table is a data structure storing information about the virtual memory subsystem of the Itanium processor. The Itanium processor architecture represents its page table using a data structure called a "virtually hashed page table" (VHPT). A VHPT is a hash table where the key is virtual address information (hence "virtually hashed") and the data is information telling the processor how to map the corresponding virtual address.

Usage of some hashing function techniques and hash table construction techniques are not available to be implemented on certain systems. For example, the Itanium architecture precisely defines the data layout of elements in a VHPT. Since it is not possible to add a data element to the VHPT head buckets to store a link, VHPT head buckets cannot be placed in a linked list.

Furthermore, reducing the number of head buckets within a VHPT to cut down on the time it takes for the computer to globally walk all head buckets is not feasible. Under normal conditions, the head buckets within a VHPT fill to capacity. Reducing the number of head buckets would degrade a VHPT's performance, as this reduction would cause an, increase in collisions.

As can be seen, current hash tables suffer from performance shortcomings when globally walking a partially filled hash table is a frequent operation. Additionally, current hash table techniques to solve such performance shortcomings may not be used with certain systems, such as the VHPT of the Itanium processor. Thus a technology which addresses these shortcomings would be advantageous.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method of mapping active collision chains in a VHPT is disclosed. The technology populates an active entry within the VHPT. A link table is maintained for locating a link at an offset from the active entry. The link table continues to be maintained as a valid link table until a link threshold is exceeded or a collision has occurred.

BRIEF DESCRIPTION OF THE DRAWINGS

The accompanying drawings, which are incorporated in and form a part of this specification, illustrate embodiments of the present technology for mapping an active entry within a virtually hashed page table and, together with the description, serve to explain principles discussed below.

The drawings referred to in this description should not be understood as being drawn to scale unless specifically noted.

DETAILED DESCRIPTION

Reference will now be made in detail to embodiments of the present technology for mapping active entries within a virtually hashed page table, examples of which are illustrated in the accompanying drawings. While the subject matter is described in conjunction with various embodiments, it will be understood that they are not intended to limit the present technology to these embodiments. On the contrary, the present technology is intended to cover alternatives, modifications and equivalents, which may be included within the spirit and scope the various embodiments as defined by the appended claims.

Furthermore, in the following detailed description, numerous specific details are set forth in order to provide a thorough understanding. However, the present technology may be practiced without these specific details. In other instances, well known methods, procedures, components, and circuits have not been described in detail as not to unnecessarily obscure aspects of the subject matter being described.

The discussion will begin with a description of the notation and nomenclature used in regards to the present technology. The discussion will then continue with an overview of the various hash table techniques currently in use and the resulting limitations associated with these techniques. The discussion will then focus on embodiments of the present technology that provide a system and method for mapping an active entry within a virtually hashed page table.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the described arts to most effectively convey the substance of their work to others skilled in their art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system.

Unless specifically stated otherwise as apparent from the following discussions, it is appreciated that throughout the present detailed description, discussions utilizing terms such as "populating", "maintaining", "continuing", "utilizing", "determining", "storing", "referencing", "globally walking", "accessing", "triggering", "indicating", "sensing", "reading", or the like, refer to the actions and processes of a computer system (such as computer 100 of FIG. 1), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology is also well suited to the use of other computer systems such as, for example, optical and virtual computers. Additionally, it should be understood that in embodiments of the present technology, one or more of the steps can be performed manually.

Overview

Hash tables are data structures optimized for accessing individual elements of the hash table by key. When there is no collision, accessing an element of the hash table given a key takes a known number of operations, which does not depend on the number of elements in the hash table. By contrast, finding an element in a linked list may take a number of operations proportional to the number of elements in the list.

However, in the present state of the technology, operations on a large number of elements of the hash table require a "global walk" of the head buckets, where each head bucket is examined individually. For example, deleting all elements of the hash table involves examining each head bucket, and for each head bucket, deleting all elements linked to this head bucket. When the hash table is nearly empty, the number of head buckets may be large relative to the number of elements stored in the hash table, making global walks inefficient. For example, if a hash table contains 10,000 head buckets, and if only 10 elements were stored in the hash table, a global walk will still examine 10,000 head buckets. By contrast, the same operation on a linked list would have examined only 10 links.

If there is no constraint on the organization of a hash table, it is easy to make global walks more efficient. For instance, one can create a linked list of head buckets containing an element, or "active head buckets". For example, if a hash table contains 10,000 head buckets, and if only 10 elements were stored in the hash table, the linked list would only contain the corresponding 10 head buckets, and a global walk would only examine the 10 active head buckets instead of every one of the 10,000 head buckets. However, external constraints may exist, which limit the ability to make certain changes in the organization of the data in a hash table. For instance, the virtually hashed page table (VHPT) is a hash table defined by the Itanium processor architecture. Its organization cannot be modified without rewriting the large body of software that depends on the organization as presently specified.

The present technology maps all active entries within a hash table, for instance a virtually hashed page table (VHPT), such that, in certain instances, accessing information on an active head bucket within the VHPT can be performed in a number of steps at most equal to the number of occupied head buckets, rather than equal to the total number of existing head buckets. The present technology provides systems and methods for mapping the active entries within a VHPT. For example, when the first element is entered in the hash table, another entry in the hash table is used in a specific way to indicate which entries are active. The present technology does not require the organization of the data in the hash table to be modified. For instance, the present technology applies to the VHPT as originally defined by the Itanium processor architecture.

The present technology maps the active head buckets using a modified form of a linked list. The linked list is maintained with the VHPT, as opposed to a linked list being maintained external to a hashed page table. For example, the link indicating that a head bucket is active is placed in another head bucket at a known location. The one-to-one relation between these two head buckets is specified by the present technology, so that in knowing an active head bucket, one can find where the head bucket containing the link is, and knowing a link head bucket, one can find where the corresponding active head bucket is. For instance, all links placed in the VHPT could be placed at the same interval distance away from the corresponding active head bucket, for example in the next or previous head bucket. A link table is created within the VHPT in this manner, such that each link head bucket references the head bucket that contains the value stored in the hash table by means of the specified one-to-one correspondence.

This method of mapping active entries within a VHPT continues until an occupied head bucket threshold has been exceeded or a collision has occurred. When the occupied head bucket threshold is exceeded or a collision has occurred, then the system reverts to the method of globally walking every head bucket in the VHPT and abandons use of this mapping method. Thus, embodiments described herein allow the mapping of active entries within a VHPT, such that a global walk within a VHPT may be implemented in a number of steps equal to a number of occupied head buckets within the VHPT.

Discussion of the application of the present technology will begin with a description of an example computer system environment with which, or upon which, embodiments of the present technology may operate. Discussion will proceed to a description of an example system for mapping an active entry within a VHPT. Components of this system will be generally described. Operation of the system and its components will then be described in conjunction with a description of an example method of mapping an active entry within a VHPT, and further with a description of a method of accessing an active entry within a VHPT. Various examples of a VHPT utilizing this method of mapping an active entry within a VHPT will be discussed in conjunction with the description of these methods in order to promote the understanding of the present technology.

Example Computer System Environment

Figure 1:
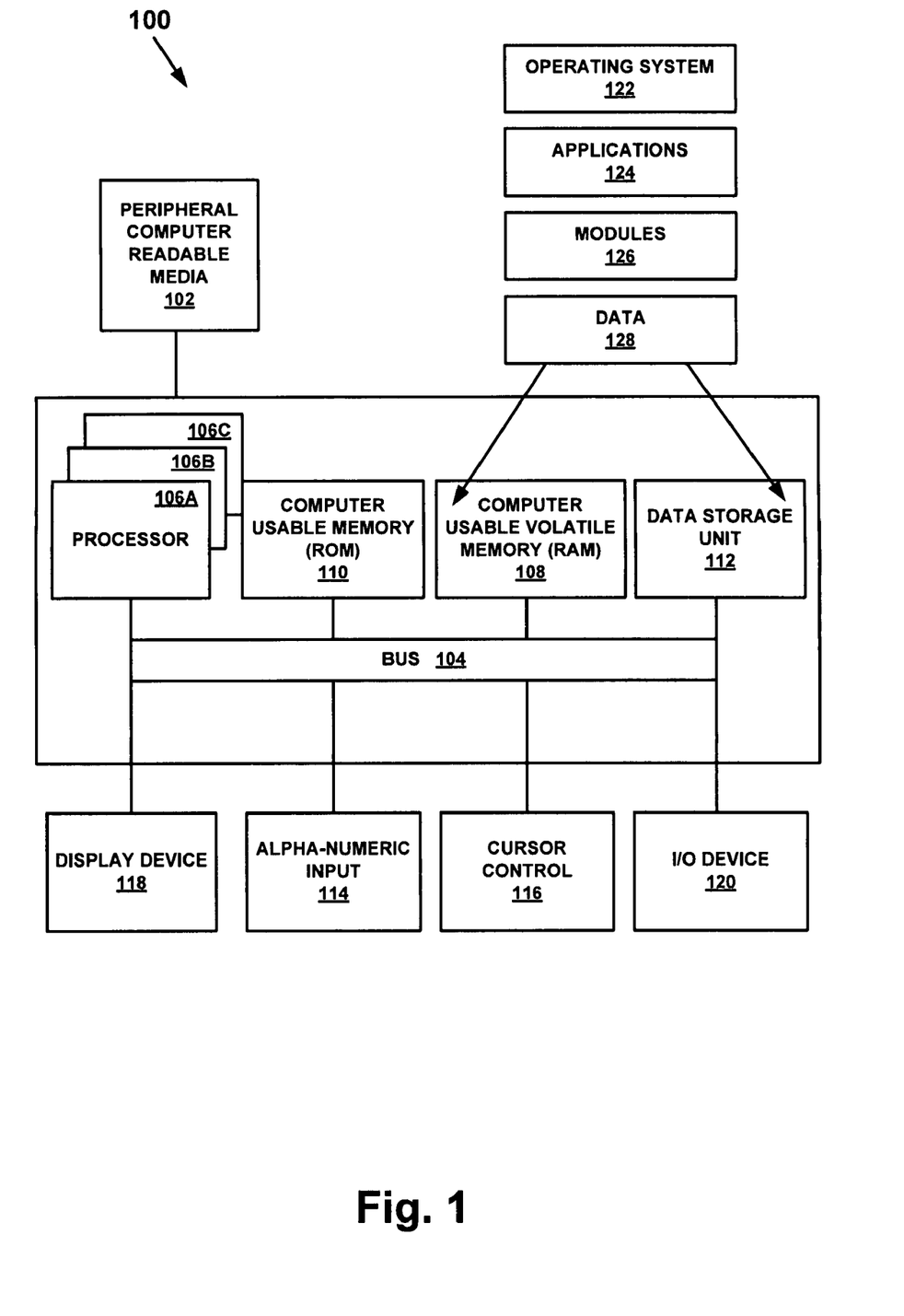
FIG. 1 is a diagram of an example computer system used in accordance with embodiments of the present technology.

With reference now to FIG. 1, portions of the present technology are composed of computer-readable and computer-executable instructions that reside, for example, in computer-usable media of a computer system. That is, FIG. 1 illustrates one example of a type of computer that can be used to implement embodiments, which are discussed below, of the present technology. FIG. 1 illustrates an example computer system 100 used in accordance with embodiments of the present technology. It is appreciated that system 100 of FIG. 1 is an example only, and that the present technology can operate on or within a number of different computer systems including general purpose networked computer systems, embedded computer systems, optical computer systems, virtual computer systems, server devices, client devices, various intermediate devices/nodes, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors.

System 100 also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions.

System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 may be a liquid crystal device, cathode ray tube, plasma display device or other display device suitable for creating, presenting, or displaying graphic images and/or symbols or alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick, directional and input keys on a multimedia remote control, or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands. System 100 is also well suited to having a cursor directed by other means such as, for example, voice commands.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology is stored, for example, as an application 124 or module 126 in memory locations within RAM 108, computer readable media within data storage unit 112, and/or peripheral computer readable media 102.

The computing system 100 is only one example of a suitable computing environment and is not intended to suggest any limitation as to the scope of use or functionality of the present technology. Neither should the computing environment 100 be interpreted as having any dependency or requirement relating to any one or combination of components illustrated in the exemplary computing system 100.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

System for Mapping an Active Entry Within a VHPT

Figure 2:
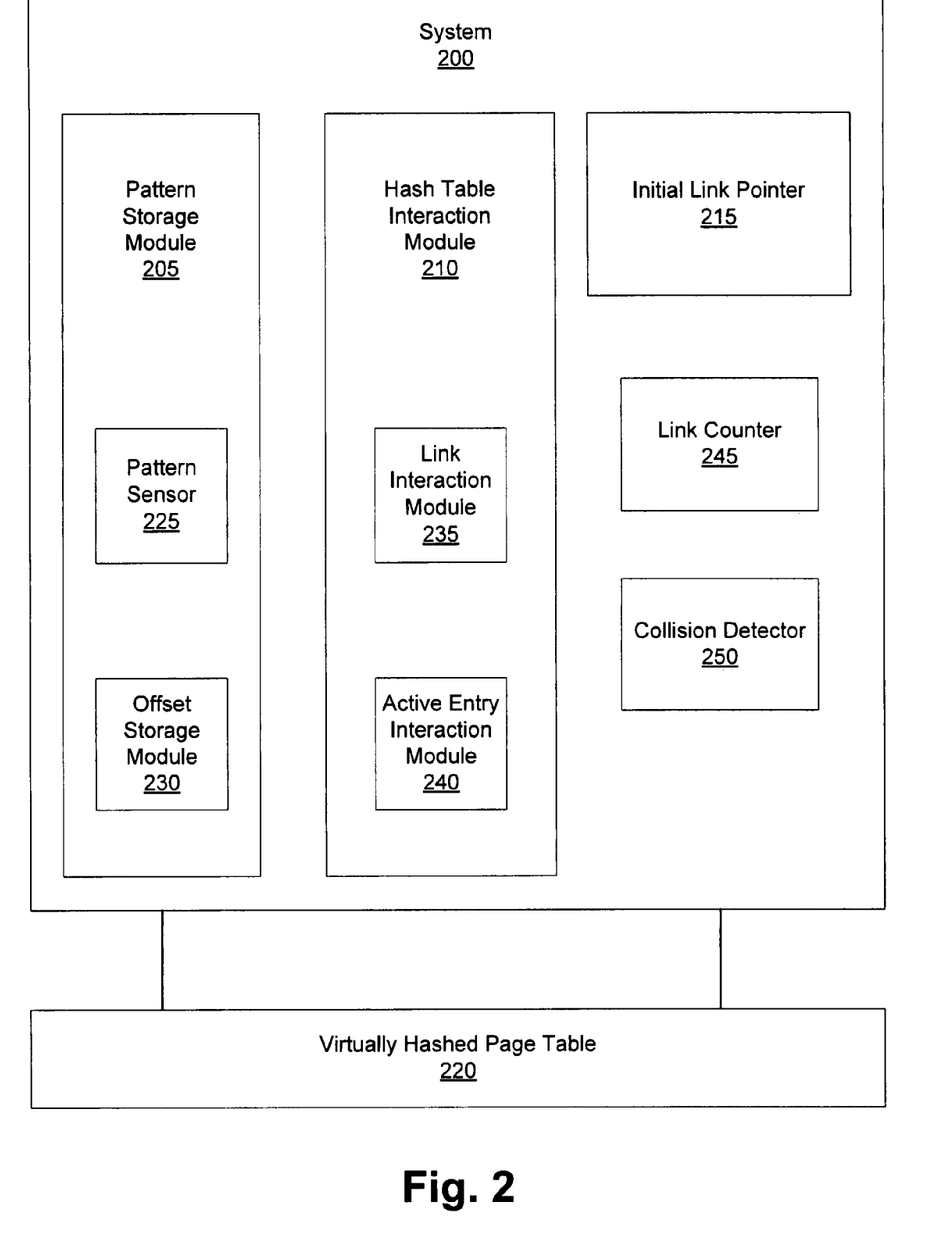
FIG. 2 is a block diagram of an example system for mapping active collision chains within a virtually hashed page table, according to an embodiment.

With reference now to FIG. 2, a block diagram is shown of a system 200 for mapping active entries within a VHPT. It is appreciated that system 200 illustrates one example embodiment, and that other configurations within the scope of the present technology are possible. As shown in FIG. 2, system 200 is comprised of a pattern storage module 205, a hash interaction module 210, an initial link pointer 215, a link counter 245, and a collision detector 250.

Additionally, pattern storage module 205 is comprised of pattern sensor 225 and offset storage module 230. Hash table interaction module 210 is comprised of a link interaction module 235 and an active entry interaction module 240. System 200 is coupled to virtually hashed page table 220.

In one embodiment, a pattern storage module 205 is configured to store a sensed hashing pattern related to VHPT 220. In one embodiment, pattern storage module 205 is comprised of pattern sensor 225 and offset storage module 230. Pattern sensor 225 recognizes the pattern created by the placement of links within VHPT 220.

Figure 3A:
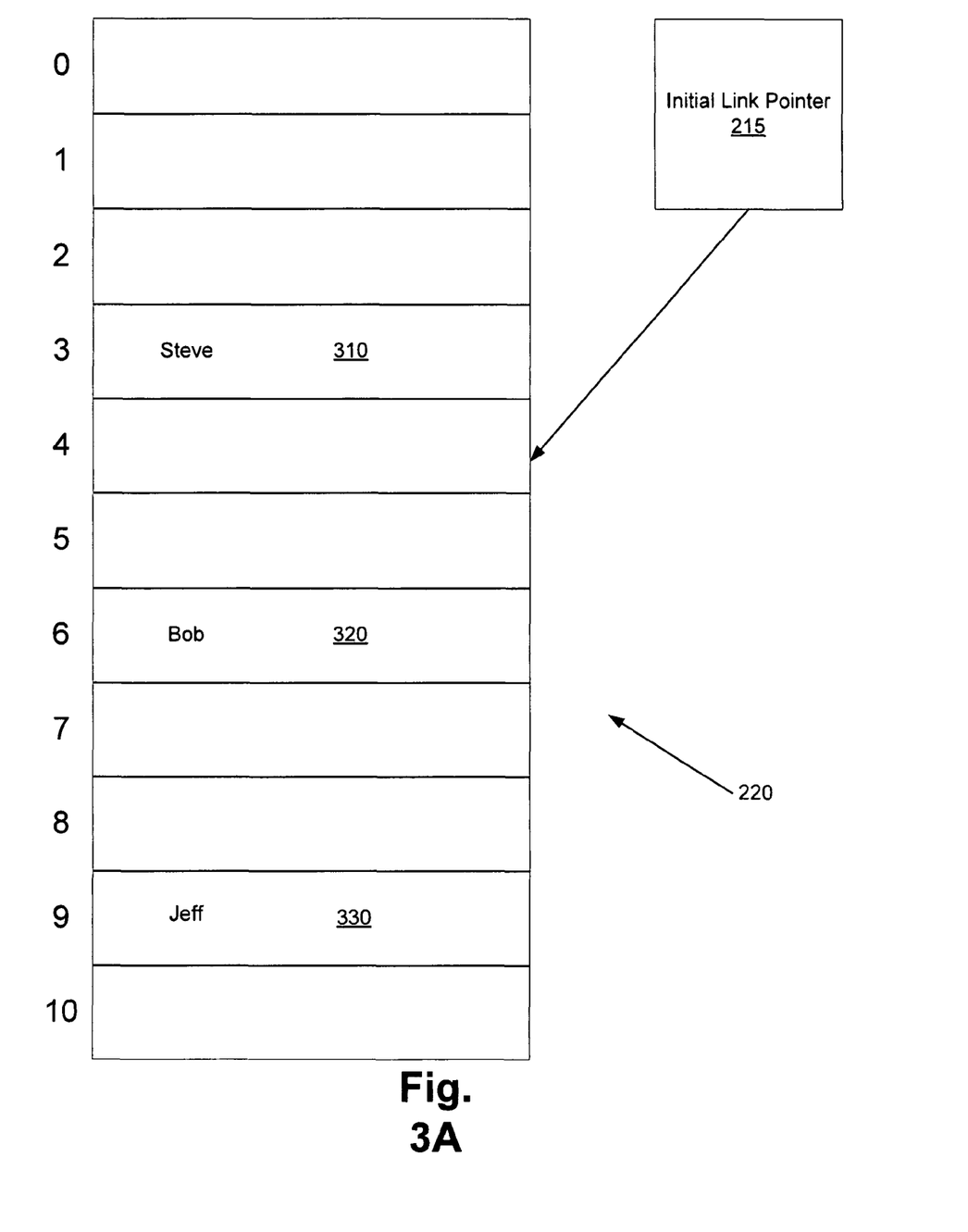
FIG. 3A represents an example of a virtually hashed page table, according to an embodiment.

For example, referring now to FIG. 3A, an example VHPT 220 is shown. VHPT 220 contains 11 head buckets, numbered 0 through 10. Head buckets 0, 1, 2, 4, 5, 7, 8, and 10 are empty. Head buckets 3, 6, and 9 are active and contain corresponding values within each one.

Pattern sensor 225 determines the pattern created by the active entries. For example, head bucket 3 (310), containing a link to head bucket 6 (320), is three head buckets away from head bucket 9 (330). Pattern sensor 225 determines the pattern created within the association of active entries so as to enable system 200 to determine where to place the links. In this case, the pattern is an interval of 3 head buckets.

While pattern sensor 225 determines the pattern created by the active entries, offset storage module 230 is configured to store an offset between a link location and an active location within VHPT 220. For example, suppose a link is stored one head bucket away from its corresponding active head bucket 310 (containing the key's corresponding value). In this case, the offset is equal to one head bucket. Thus, an offset of −1 would be used to find head bucket 3 from a link placed in head bucket 4.

In one embodiment, when a pattern is already known, it is stored in pattern storage module 205, thus eliminating the requirement to sense a storage pattern related to active entries.

In one example of the present technology, hash table interaction module 210 is configured to store data in VHPT 220 and read data from VHPT 220. In one embodiment, hash table interaction module 210 is comprised of link interaction module 235 and active entry interaction module 240.

Link interaction module 235 is configured to store and read links in VHPT's 220 link table. The storing of links creates a link table in VHPT 220 which is used to locate active entries. Active entry interaction module 240 is configured to read and store active entries in VHPT 220.

In one embodiment, initial link pointer 215 is configured to indicate the stored position of a first link in VHPT's 220 link table. For example, referring to VHPT 220 of FIG. 3A, initial link pointer 215 indicates that the first link entered into VHPT 220 was at head bucket 4.

In another example of the present technology, system 200 comprises link counter 245 configured to determine an exit condition. An exit condition is a condition, the occurrence of which triggers system 200 to revert to globally walking every existing head bucket to find requested information. For example, an exit condition occurs when the number of links entered into VHPT 220 exceeds a pre-determined number of allowable links.

In yet another example of the present technology, system 200 comprises collision detector 250 configured to determine an exit condition. In this case, an exit condition occurs as a result of a collision, such as a collision between an active entry and a link being stored.

Pattern storage module 205, hash table interaction module 210, initial link pointer 215, link counter 245, collision detector 250, and VHPT 220 may be coupled alone or in combination with any number of elements or modules within system 200, as well as to VHPT 220. For example, in one embodiment, pattern storage module 205 may be coupled to initial link pointer 215 and to VHPT 220. In another example, pattern storage module 205 may be coupled to hash table interaction module 210, initial link pointer 215, and VHPT 220.

Operation of the Present System for Mapping an Active Entry Within a VHPT

Figure 4:
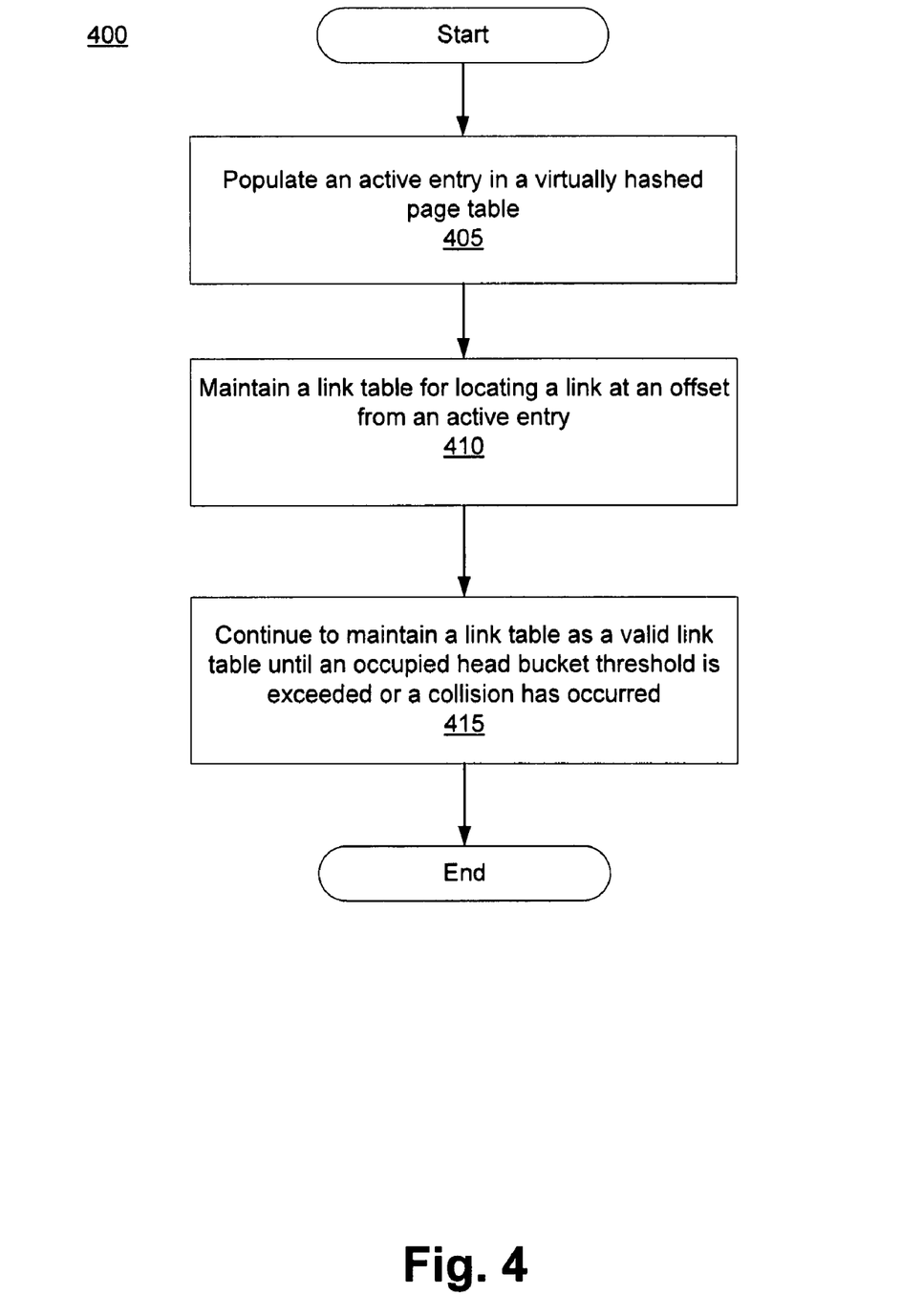
FIG. 4 is a flow diagram of an example method of mapping active collision chains in a virtually hashed page table, according to an embodiment.
Figure 5:
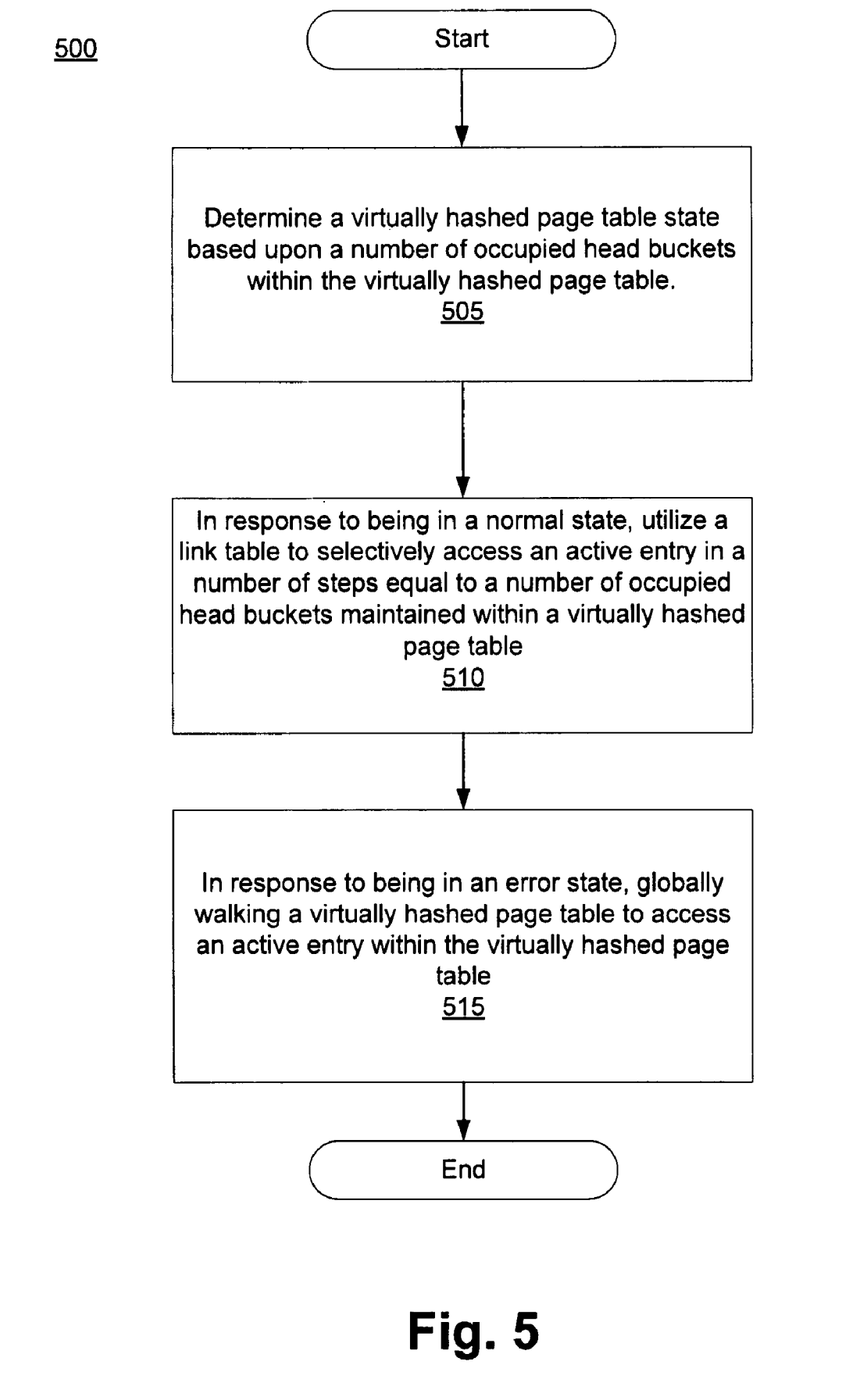
FIG. 5 illustrates an example method of accessing active entries in a virtually hashed page table, according to an embodiment.

The following discussion sets forth in detail the operation of present technology through a description of example embodiments. With reference to FIGS. 4 and 5, flow diagrams 400 and 500 each illustrate example steps used by methods and/or processes according to various embodiments described herein. Flow diagrams 400 and 500 include processes that, in various embodiments, are carried out by a processor under the control of computer-readable and computer-executable instructions. The computer-readable and computer-executable instructions reside, for example, in data storage features such as computer usable volatile memory 108, computer usable non-volatile memory 110, and/or data storage unit 112 of FIG. 1. The computer-readable and computer-executable instructions are used to control or operate in conjunction with, for example, processor 106A and/or processors 106A, 106B, and 106C of FIG. 1. Although specific steps are disclosed in flow diagrams 400 and 500 such steps are examples. It is appreciated that embodiments described herein are well suited to performing various other steps or variations of the steps recited, that the recited steps may be performed in an order different than presented, and that not all of the recited steps may be performed in every embodiment.

Method for Mapping an Active Entry Within a VHPT

Figure 3B:
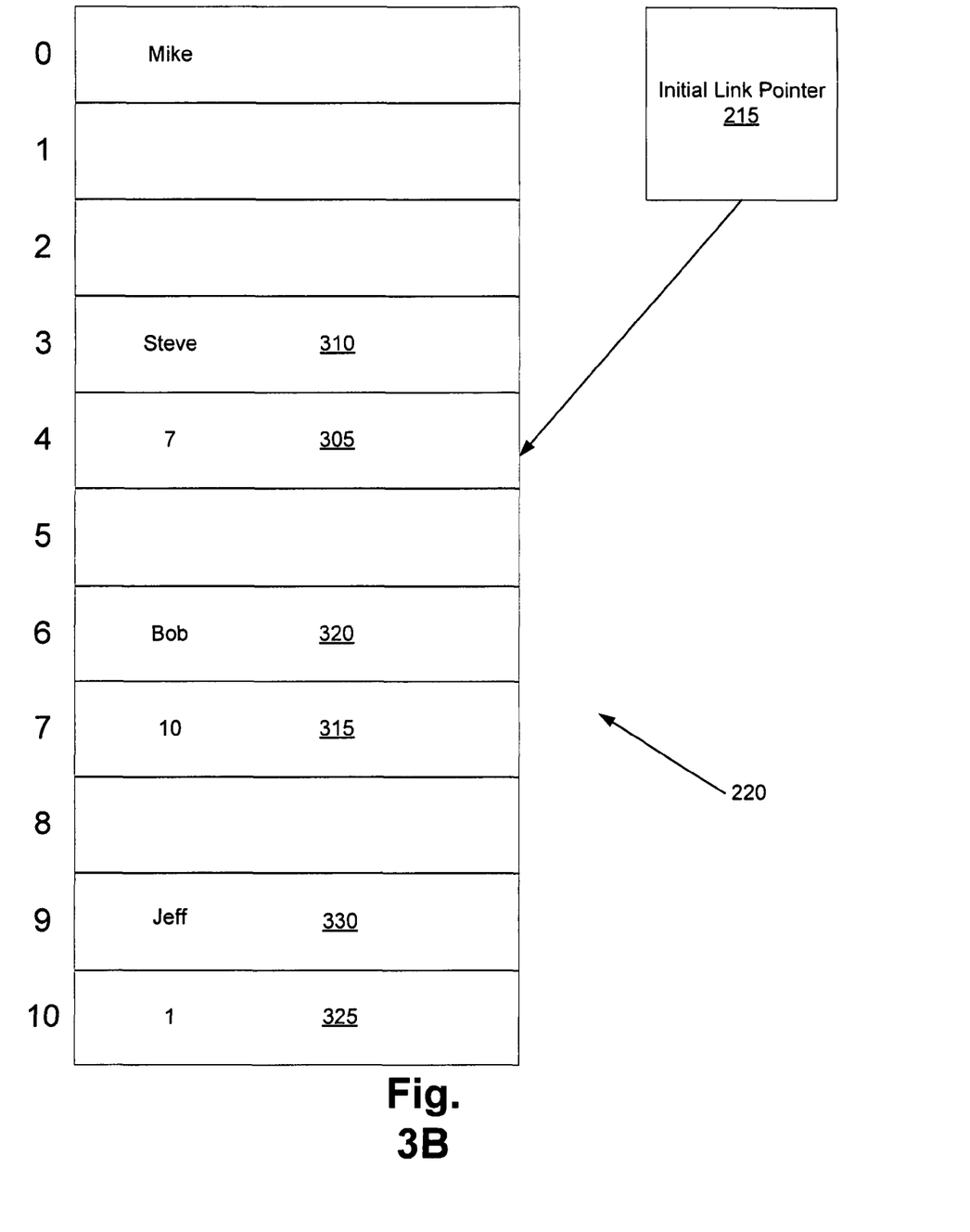
FIG. 3B represents an example of a virtually hashed page table utilizing the method of mapping active collision chains in a virtually hashed page table, according to an embodiment.

Referring now to 405 of FIG. 4, and to FIG. 2, and FIG. 3B, one embodiment populates an active entry within VHPT 220. In populating an active entry, system 200 utilizes a hash function. The hash function may be any algorithmic function used to transform data into a number. The chosen hash function transforms a first key (which may be a number/numbers and/or one or more words) into a number, deemed a hash value. The hash value is then used to represent one of a VHPT's head buckets within an array of head buckets.

With reference to FIG. 3B, the head buckets (0-10) of VHPT 220 are arranged in a numerical ascending manner starting with zero. However, it is appreciated that in other embodiments, head buckets may be arranged in a different order other than ascending, and may begin with a number other than zero. The corresponding value for the first key is inserted into a head bucket, corresponding to the hash value. For example, a first key is transformed into the hash value of 3. The hash value of 3 is represented by the head bucket 3. The first key's corresponding value, Steve, is placed in head bucket 3.

Referring now to 410 of FIG. 4, in one embodiment, a link table is maintained for locating a link at an offset from an active entry. This link table is located within and among the array of the head buckets of VHPT 220. It is an aggregation of head buckets, linked by way of the content within the head buckets. Referring now to FIG. 3B, for example, head bucket 4 contains the content "7". Head bucket 4 is pointing to head bucket 7 and is hence linked to head bucket 7. Similarly, head bucket 7 contains the content "10". Head bucket 7 is pointing to head bucket 10 and is hence linked to head bucket 10. Finally, head bucket 10 contains the content "1" and is pointing to head bucket 1. Head bucket 10 is linked to head bucket 1. The head buckets, 4, 7, 10, and 1 make up an ever growing and shrinking link table. The link table grows when new active entries are added to VHPT 220.

In one embodiment, a link is stored according to a hashing pattern within the link table used to store an active link. For example, VHPT 220 of FIG. 3 shows a hashing pattern within the link table of links being spaced at an interval of one head bucket apart from the active entry. In one instance, system 200 is configured to determine this hashing pattern. For example, system 200 may be pre-programmed to develop an interval link storing pattern according to some offset from a hash pattern of active entries. In another instance, system 200 is configured to reference a hash pattern, for example, when the hash pattern is already known. For instance, system 200 may be programmed to follow the instructions of a pre-programmed and hence predetermined hash pattern as to the required interval between a key's corresponding value and the head bucket referencing a link. A pre-determined offset may be an offset deliberately calculated by a function internal and/or external to system 200. Additionally, a pre-determined offset may be an offset that is calculated after a first active entry has been inserted into VHPT 220.

Furthermore, in one embodiment, a position of an initial link within a link table is stored in a storage location apart from the VHPT 220. For example, initial link pointer 215 stores the location of the first head bucket chosen to store the first link. In this way, a link table may be tracked from its inception to its finale. For example, referring now to FIG. 3B, suppose VHPT 220 was empty. The active entry Steve (310) is inserted into head bucket 3. Then the entry of '7' is made into another head bucket, which is a reference and link to head bucket 7. Initial link pointer 215 then points to head bucket 4, the first link reference inserted into VHPT 220. It is appreciated that the storage location storing initial link pointer 215 may be initial link pointer 215 itself, or a separate storage location communicatively coupled to initial link pointer 215.

The offset in head buckets between the first active entry, Steve, and the initial link pointer 215 is calculated. In this case, the offset is −1. It is appreciated that the first link may be place into any unoccupied head bucket. However, in storing links, system 100 senses a pattern created by the placement of active entries into the head buckets, according to a hash function. This sensed pattern is communicated to initial link pointer 215. Initial link pointer 215 in turn, avoids putting an initial link into a head bucket that will likely eventually hold an active entry according to the sensed pattern.

In yet another embodiment, a valid link table is utilized to access active entries such that VHPT 220 can walk the active entries in a number of steps equal to a number of occupied head buckets (used entries) within VHPT 220. Utilizing system 200's method of mapping, requested information may be sought from VHPT 220 such that only head buckets that are occupied are examined. This method reduces the number of steps needed to find information, as compared to globally walking, and hence saves time and money. Additionally, because the links are maintained within VHPT 220, extra memory does not need to be allocated, such as occurs in other linking methods.

For example, referring to VHPT 220 of FIG. 3B, there are 11 head buckets, with 7 head buckets occupied. If a user seeks the information with the corresponding value of Jeff, then system 200 would access just head buckets 4, 3, 7, 6, 10, and 9. Using the present technology, only 6 head buckets were examined, instead of all 11 head buckets. With the direction of initial link pointer 215, system 200 began its search at head bucket 4 and followed the linked list until it found the sought after data.

Referring now to 415 of FIG. 4, in one embodiment, a link table continues to be maintained as a valid link table until a link threshold is exceeded or a collision has occurred. In other words, system 200 continues to populate entries with VHPT 220 as described above unless it is determined that the number of links inserted into VHPT 220 exceeds a pre-determined threshold for holding links, or a collision has occurred. For instance, a link threshold may be exceeded if more than one half of an available number of head buckets in a link table are occupied. This is because adding additional links after this will cause a collision which destroys the mapping done by system 200. Occupied is defined as a head bucket being in an active or a linked state. In another instance, a pre-determined threshold may be defined such that, some level less than one-third, such as one-third of an available number of head buckets in a link table must be occupied, prior to causing an error condition.

Another way to discontinue the process of populating active entries within VHPT 220 is to determine that a collision has occurred. A collision occurs when system 200 attempts to place information into a head bucket which is already full. Once the link threshold is exceeded or a collision has occurred, system 200 is not interested in continuing the present technology's method of tracking data within VHPT 220. System 200 reverts to globally walking each and every head bucket to search for requested information.

Thus, the present technology provides a method and system for mapping active entries within VHPT 220 by inserting a first key's corresponding value into ahead bucket. Links are placed at a predetermined offset from active entries, thereby creating links that may be tracked to find the active entries. While using this method of linking within VHPT 220, this enables system 200 to search for requested data by globally walking only those head buckets that are occupied, as opposed to having to search every head bucket until the data is found. Additionally, since linkage occurs within VHPT 220 itself, extra memory is not needed as is the case with linking through techniques such as chaining. The present technology thus saves resources such as time, memory use, and ultimately money.

Method for Accessing an Active Entry Within a VHPT

Referring now to 505 of FIG. 5, in one embodiment a VHPT 220 state is determined based upon a number of occupied head buckets associated with VHPT 220. For example, VHPT's 220 state may be in a normal state or in an error state. A normal state corresponds to the operation of placing entries into head buckets without either collisions occurring or exceeding a threshold occupied head bucket value. An error state corresponds to the occurrence of either collisions or exceeding a threshold occupied head bucket value when attempting to place entries into head buckets.

Referring now to 510 of FIG. 5, in one embodiment, in response to VHPT 220 being in a normal state, a link table is utilized to selectively access active entries in a number of steps equal to the number of occupied head buckets maintained in VHPT 220. As described herein, active entries can be found at a known offset from a link location. A link table maintains within head buckets of the VHPT and keeps track of which head buckets contain links. Once a link's location is determined, the offset from this link location is calculated, and the active entry containing an active entry is found.

Moreover, in one instance, a link location is utilized as a pointer to a subsequent link of the link table. As described herein, a link location at a first head bucket contains an address representing a location of a second head bucket. The second head bucket contains a link to a third link location, and so on, as links are added to correspond with added active entries.

Referring now to 515 of FIG. 5, in one embodiment, in response to being in an error state, VHPT 220 is globally walked in order to access active entries within VHPT 220. Furthermore, an error state is triggered in response to a number of occupied head buckets exceeding a predetermined threshold. In one embodiment, an error state is triggered when the number of links is greater than fifty percent of the number of total head buckets in VHPT 220. For example, if there are 10,000 head buckets containing 5,001 link entries in VHPT 220, an error state is triggered because 5,001 links is greater than fifty percent of 10,000, the total number of head buckets in VHPT 220. It is appreciated that in some embodiments the threshold of filled buckets which triggers an error state may be a value less than one half of the total number of head buckets.

Additionally, in another embodiment, an error state is triggered when a collision condition occurs within VHPT 220. For example, if system 200 attempts to place data with an already occupied head bucket, a collision condition will occur. In response to this collision condition, VHPT 220 is globally walked such that every head bucket is examined.

Thus, the present technology provides a method for accessing active entries in VHPT 220. Initially, system 200 determines whether VHPT 220 is in a normal or error state. If a normal state exists, then system 200 may search for requested information in the number of steps at most equal to the number of occupied head buckets within VHPT 220. If system 200 is in an error state, either from having too many occupied head buckets or sustaining a collision condition, then system 200 reverts to globally walking the head buckets in search of information such that every head bucket is examined. Thus, while in a normal state, the present technology saves resources such as time and money, by providing a more efficient method for searching for requested data than simply resorting to globally walking the VHPT in search of data.

Although the subject matter has been described in a language specific to structural features and/or methodological acts, it is to be understood that the subject matter defined in the appended claims is not necessarily limited to the specific features or acts described above. Rather, the specific features and acts described disclosed as example above are forms of implementing the claims.

What is claimed is:

1. A computer-implemented method for mapping an active entry within a virtually hashed page table, said method comprising:
   populating an active entry in said virtually hashed page table by a computer;
   maintaining a link table for locating a link at an offset from said active entry by said computer; and
   continuing to maintain said link table as a valid link table until an occupied head bucket threshold is exceeded or a collision has occurred by said computer.

2. The computer-implemented method as recited in claim 1, wherein said populating an active entry in said virtually hashed page table further comprises:
   utilizing a hash function.

3. The computer-implemented method as recited in claim 1, wherein said maintaining a link table for locating a link at an offset from said active entry further comprises:
   storing said link according to a hashing pattern.

4. The computer-implemented method as recited in claim 3, wherein said storing said link according to a hashing pattern within said link table used to store said active link further comprises:
   determining said hash pattern.

5. The computer-implemented method as recited in claim 3, wherein said storing said link according to a hashing pattern within said link table used to store said active link further comprises:
   referencing said hash pattern.

6. The computer-implemented method as recited in claim 1, wherein said maintaining a link table for locating a link at an offset from said active entry further comprises:
   storing a position of an initial link within said link table in a storage location apart from said virtually hashed page table.

7. The computer-implemented method as recited in claim 1, wherein said continuing to maintain said link table as a valid link table until an occupied head bucket threshold is exceeded or a collision has occurred further comprises:
   determining if a collision has occurred.

8. The computer-implemented method as recited in claim 1, wherein said continuing to maintain said link table as a valid link table until an occupied head bucket threshold is exceeded or a collision has occurred further comprises:
   utilizing said valid link table to access said active entry such that said virtually hashed page table can be walked in a number of steps equal to a number of occupied head buckets within said virtually hashed page table.

9. The computer-implemented method as recited in claim 1, wherein said continuing to maintain said link table as a valid link table until an occupied head bucket threshold is exceeded or a collision has occurred further comprises:
   determining if said link table has exceeded one half of an available number of head buckets in said link table.

10. A computer readable storage medium comprising computer-executable instructions stored thereon, wherein the instructions when executed cause a computer system to perform a method for accessing an active entry in a virtually hashed page table, said method comprising:
   determining a virtually hashed page table state based upon a number of occupied head buckets within said virtually hashed page table;
   in response to being in a normal state, utilizing a link table to selectively access said active entry in a number of steps equal to said number of occupied head buckets maintained within said virtually hashed page table; and
   in response to being in an error state, globally walking said virtually hashed page table to access said active entry within said virtually hashed page table.

11. The computer readable storage medium as recited in claim 10, wherein said determining a virtually hashed page table state based upon a number of occupied head buckets with said virtually hashed page table further comprises:
   triggering said error state in response to said number of occupied head buckets exceeding a predetermined threshold.

12. The computer readable storage medium as recited in claim 11, wherein said triggering said error state in response to said number of occupied head buckets exceeding a predetermined threshold comprises:
   triggering said error state when a number of links within said link table is greater than fifty percent of a number of head buckets in said virtually hashed page table.

13. The computer readable storage medium as recited in claim 10, wherein said determining a virtually hashed page table state based upon a number of occupied head buckets with said virtually hashed page table further comprises:
   determining said virtually hashed page table state based upon a collision condition occurring within said virtually hashed page table.

14. The computer readable storage medium as recited in claim 10, wherein said in response to being in a normal state, utilizing a link table to selectively access said active entries in a number of steps equal to said number of occupied head buckets maintained in said virtually hashed page table further comprises:
   utilizing a link location as a pointer to a subsequent link of said link table.

15. A computer system for mapping an active entry within a virtually hashed page table, said system comprising:
   a processor; and
   memory, wherein said memory comprises executable instructions stored therein that when executed by said processor:
   store a sensed hashing pattern related to said virtually hashed page table;
   store data in and read data from said virtually hashed page table; and
   indicate a stored position of a first link in a link table.

16. The system as recited in claim 15, wherein said store a sensed hashing pattern comprises:
   sense said hashing pattern; and
   storing an offset between a link location and an active location in said virtually hashed page table.

17. The system as recited in claim 15, wherein said store data in and read data comprises:
   store and read a link within said link table.

18. The system as recited in claim 15, wherein said store data in and read data comprises:
   read and store said active entry within said virtually hashed page table.

19. The system as recited in claim 15, wherein said computer system further comprises:
   a link counter configured for determining an exit condition.

20. The system as recited in claim 15, wherein said computer system further comprises:
   a collision detector configured for determining an exit condition.

* * * * *